(12) United States Patent
Makita

(10) Patent No.: US 9,139,069 B2
(45) Date of Patent: Sep. 22, 2015

(54) MIX DOOR STRUCTURE

(71) Applicant: CALSONIC KANSEI CORPORATION, Saitama (JP)

(72) Inventor: Yuki Makita, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 13/724,136

(22) Filed: Dec. 21, 2012

(65) Prior Publication Data

US 2013/0160368 A1    Jun. 27, 2013

(30) Foreign Application Priority Data

Dec. 26, 2011    (JP) ................................. 2011-283607

(51) Int. Cl.
- *B60H 1/32* (2006.01)
- *B60H 1/00* (2006.01)
- *E05D 15/16* (2006.01)

(52) U.S. Cl.
CPC .......... *B60H 1/00692* (2013.01); *E05D 15/165* (2013.01)

(58) Field of Classification Search
CPC .......... B60H 1/00207; B60H 1/00228; B60H 1/00485; B60H 1/00849; B60H 1/00857
USPC ............... 49/83.1, 362, 40, 41; 454/221, 160, 454/156, 161, 109, 145, 155
See application file for complete search history.

(56) References Cited

U.S. PATENT DOCUMENTS

| | | | |
|---|---|---|---|
| 6,609,389 B2 * | 8/2003 | Ozeki et al. ...................... | 62/244 |
| 6,609,563 B1 * | 8/2003 | Tsurushima et al. ......... | 165/204 |
| 6,659,167 B2 * | 12/2003 | Tsurushima et al. ........... | 165/43 |
| 6,814,137 B2 * | 11/2004 | Tsurushima et al. ......... | 165/202 |
| 6,814,138 B2 * | 11/2004 | Tsurushima et al. ......... | 165/202 |
| 2002/0189787 A1 * | 12/2002 | Tsurushima et al. ............ | 165/42 |
| 2003/0145978 A1 * | 8/2003 | Tsurushima et al. ........ | 165/11.1 |

(Continued)

FOREIGN PATENT DOCUMENTS

| | | |
|---|---|---|
| CN | 102032656 A | 4/2011 |
| CN | 102865658 A | 1/2013 |

(Continued)

OTHER PUBLICATIONS

Extended European Search Report issued Jan. 30, 2014 in corresponding European Application No. 12198616.0.

*Primary Examiner* — Katherine Mitchell
*Assistant Examiner* — Scott Denion
(74) *Attorney, Agent, or Firm* — Wenderoth, Lind & Ponack, L.L.P.

(57) ABSTRACT

A mix door structure has drive force for opening and closing a slide door part of a middle slide door unit among multiple slide door units arranged side by side transmitted by an input shaft. The input shaft includes an inner input shaft part (input gear and inner input shaft) which is rotationally supported on two sides at both end portions thereof on bearings provided to a pair of door attachment wall parts of the middle slide door unit and an outer input shaft part (outer input shaft and rotary member) which is rotationally supported on one side on a first shaft hole provided in an outer door attachment wall part of an outermost slide door unit. The inner and outer input shaft parts are coupled to each other through a coupling hole in the inner input shaft part.

2 Claims, 7 Drawing Sheets

(56) References Cited

U.S. PATENT DOCUMENTS

| | | | |
|---|---|---|---|
| 2003/0232590 A1* | 12/2003 | Okumura et al. | 454/121 |
| 2006/0046633 A1 | 3/2006 | Goupil et al. | |
| 2009/0241574 A1* | 10/2009 | Ozeki et al. | 62/239 |
| 2011/0076931 A1 | 3/2011 | Ikeda | |
| 2013/0008203 A1* | 1/2013 | Makita et al. | 62/515 |
| 2013/0160971 A1* | 6/2013 | Makita et al. | 165/59 |

FOREIGN PATENT DOCUMENTS

| | | |
|---|---|---|
| JP | 03-164324 | 7/1991 |
| JP | 2001-113936 | 4/2001 |
| JP | 2012-81787 | 4/2012 |
| JP | 2012-81788 | 4/2012 |
| JP | 2013-18312 | 1/2013 |
| WO | 2007/061039 | 5/2007 |

* cited by examiner

MIX DOOR STRUCTURE

CROSS REFERENCE TO RELATED APPLICATIONS

The present application is based on and claims priority from Japanese Application Number 2011-283607, filed on Dec. 26, 2011, the disclosure of which is hereby incorporated by reference herein in its entirety.

BACKGROUND OF THE INVENTION

1. Field of the Invention

This invention relates to a mix door structure for an air conditioning apparatus (hereinafter, referred to as "air conditioner") for use in vehicles.

2. Description of the Related Art

Vehicles such as automobiles are equipped with an air conditioner for controlling the temperature of the cabin and the flow of air inside the cabin.

This air conditioner includes: an air-conditioner body which is placed in front of the cabin and ducts through which to send conditioning air from the air-conditioner body to outlet ports provided in given areas of the cabin.

The air-conditioner body includes a hollow air-conditioner casing, and an air inlet and an air outlet provided in this air-conditioner casing.

The hollow air-conditioner casing includes therein an evaporator (heat exchanger for cooling) and a heater core (heat exchanger for heating) in this order from an upstream side. A space downstream of the evaporator is separated into a warm-air passage and a bypass passage, and the heater core is provided inside the warm-air passage. Moreover, between the evaporator and the heater core is provided a mix door which is capable of dividing and distributing conditioning air having passed through the evaporator to the warm-air passage and the bypass passage.

This mix door includes a slide door unit which includes: a frame-shaped slide door case having a warm-air opening and a cool-air opening; and a slide door part capable of sliding along this slide door case to open and close the warm-air opening and the cool-air opening or to adjust their opening degrees.

The slide door unit includes door attachment wall parts which allow the slide door part to be attached to the slide door case. Moreover, the slide door unit includes slide guide parts on which the slide door part is supported slidably. Furthermore, a slide drive part capable of driving the slide of the slide door part is provided on an upstream side of the slide door unit.

This slide drive part includes: a rack part which is provided to the slide door part and extends in the direction of the slide; and a gear mechanism part which transmits, to this rack part, drive force transmitted from outside the slide door unit through a drive shaft.

As an example of a slide door with such a structure, a slide door structure in Japanese Patent Application Publication No. 2001-113936 has been proposed.

SUMMARY OF THE INVENTION

The slide door structure described in Japanese Patent Application Publication No. 2001-113936 is designed to open and close one slide door. Now, suppose that several slide door devices described in Japanese Patent Application Publication No. 2001-113936 are coupled to form a mix door that controls air conditioning of several areas in the cabin independently of each other. In this case, the slide drive part of the middle slide door may interfere with the slide drive parts of the adjacent slide doors. Thus, the drive shaft for opening and closing the middle slide door cannot be placed, making it impossible to transmit drive force from outside.

In order to solve the above problem, a mix door structure of a first aspect of the present invention provides a mix door structure including a slide door unit having; a frame-shaped slide door case having a pair of air passage ports as a warm-air opening and a cool-air opening; a slide door part attached to a pair of door attachment wall parts provided on both lateral sides of the slide door case, the slide door part being slidable along the slide door case to be capable of opening and closing the warm-air opening and the cool-air opening or adjusting opening degrees thereof; and a slide drive part capable of driving slide of the slide door part relative to the slide door case. The slide drive part at least includes a rack part provided to the slide door part and extending in a direction in which the slide door part slides, an output gear meshing with the rack part, and an output shaft supporting the output gear between the pair of door attachment wall parts at a boundary of the warm-air opening and the cool-air opening. At least three of the slide door units are aligned in an axial direction of each of the output shafts. An input shaft including an input gear which meshes with the output gear and extending from the slide door unit located in a middle to the slide door unit located on an outermost side is placed in parallel with the output shaft of the outermost slide door unit, and is dividable into an inner input shaft part including at least the input gear, and an outer input shaft part. The inner input shaft part is rotationally supported on two sides at both end portions thereof on the pair of door attachment wall parts of the middle slide door unit, the outer input shaft part is rotationally supported on one side at an outer end thereof on the outer door attachment wall part of the outermost slide door unit, and an inner end portion of the outer input shaft part and the inner input shaft part are capable of being coupled to each other.

In addition, the mix door structure of a second aspect of the present invention is that the inner input shaft part has a coupling hole to which an inner end portion of the outer input shaft part is capable of being coupled by fitting, the coupling hole provided at least in an axial end portion of the inner input shaft part to which the outer input shaft part is coupled.

Moreover, the mix door structure of third and fourth aspects of the present invention is that the pair of slide door units located on the outermost sides are formed in the same shape and are usable in a state where a given pair of the door attachment wall parts thereof face opposite sides. The outer door attachment wall part of each of the outermost slide door units includes both a first shaft support on one side capable of rotationally supporting the outer end portion of the outer input shaft part, and a second shaft support on the other side capable of rotationally supporting the outer end portion of the outer input shaft part. Additionally, the inner input shaft part has a pair of coupling holes to each of which an inner end portion of the outer input shaft part is capable of being coupled by fitting, the coupling holes provided in both end portions of the inner input shaft part.

According to the mix door structure of the first aspect of the present invention configured as above, the input shaft includes the input gear for transmitting drive force to the rack part provided to the slide door part of the middle slide door unit among the three or more slide door units arranged side by side and extends in the direction in which the slide door part slides, and to the output gear meshing with the rack part. The input shaft is dividable into the inner input shaft part including the input gear and the outer input shaft part and placed in parallel with the output shafts. The inner input shaft part is rotationally supported on two sides at both end portions thereof on the pair of door attachment wall parts of the middle slide door unit. The outer input shaft part is rotationally supported on one side at the outer end portion thereof on the outer door attachment wall part of an outermost slide door unit. The inner end portion of the outer input shaft part is capable of being coupled to the inner input shaft part. Thus, drive force for opening and closing operations of the slide door part can be securely transmitted to the output gear of the middle slide door unit. Accordingly, the slide door parts of the multiple slide door units arranged side by side can perform the opening and closing operations independently of each other with a simple structure. Thereby, achieved is an advantageous effect that allows independent, separate control of air conditioning of given areas of the cabin to which conditioning air, having passed through the openings in the slide door cases of the slide door units, is supplied.

Moreover, according to the mix door structure of the second aspect of the present invention, the inner input shaft part of the middle slide door has the coupling hole to which the inner end portion of the outer input shaft part is capable of being coupled by fitting, the inner input shaft part having the coupling hole at least in the axial end portion of the inner input shaft part to which the outer input shaft part is coupled. Thus, the outer input shaft part rotationally supported on one side on the outer door attachment wall part of the outermost slide door unit can be separated from the inner input shaft part of the middle slide door unit. Thereby, achieved is an advantageous effect that allows improvement in the ease in assembling, or coupling, the middle slide door unit to the outermost slide door unit.

Further, according to the mix door structure of the third aspect of the present invention, the pair of slide door units located on the outermost sides are formed in the same shape and are usable in a state where the outer door attachment wall parts thereof are set to face the opposite sides. Thus, the outermost slide door units have a common structure. Thereby, achieved is an advantageous effect that allows reduction in the number of components.

In addition, according to the mix door structure of the third aspect of the present invention, the outer door attachment wall part of each of the outermost slide door units includes both the first shaft support on one side capable of rotationally supporting the outer end portion of the outer input shaft part, and the second shaft support on the other side capable of rotationally supporting the outer end portion of the outer input shaft part. Further, the inner input shaft of the middle slide door unit has the pair of coupling holes to each of which the inner end portion of the outer input shaft part is capable of being coupled by fitting, the inner input shaft part having the coupling holes in both end portions of the inner input shaft part. Thereby, achieved is an advantageous effect that allows the outer input shaft part, which transmits drive force for opening and closing operations of the slide door part to the output gear of the middle slide door unit, to be provided to either side in the direction of the axis of the output shaft of the middle slide door unit.

DESCRIPTION OF THE EMBODIMENT

Hereinbelow, an embodiment of the present invention will be described with reference to the drawings.

FIGS. 1 to 8 show this embodiment.

Embodiment

Hereinbelow, a configuration of the invention of the present application will be described with reference to FIGS. 1 to 8.

Figure 1:
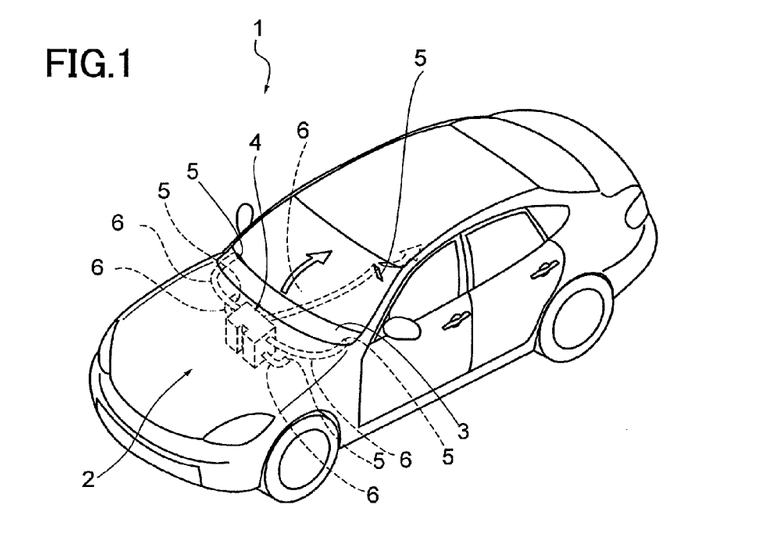
FIG. 1 is a perspective view of a vehicle equipped with an air conditioner according to an embodiment of the present invention.
Figure 2:
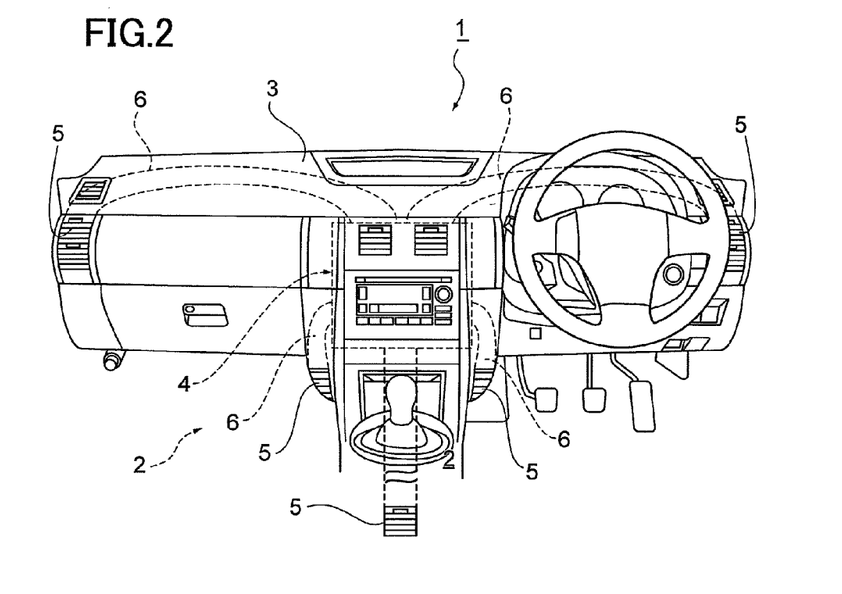
FIG. 2 is a view of an instrument panel in FIG. 1 seen from a passenger side.

As shown in FIGS. 1 and 2, a vehicle 1 such as an automobile is equipped with an air conditioning apparatus (hereinafter, referred to as "air conditioner 2").

This air conditioner 2 includes an air-conditioner body 4, which is provided behind an instrument panel 3 placed in a front area of the cabin and ducts 6 through which to send conditioning air from the air-conditioner body 4 to outlet ports 5 provided in given areas of the cabin.

Figure 3:
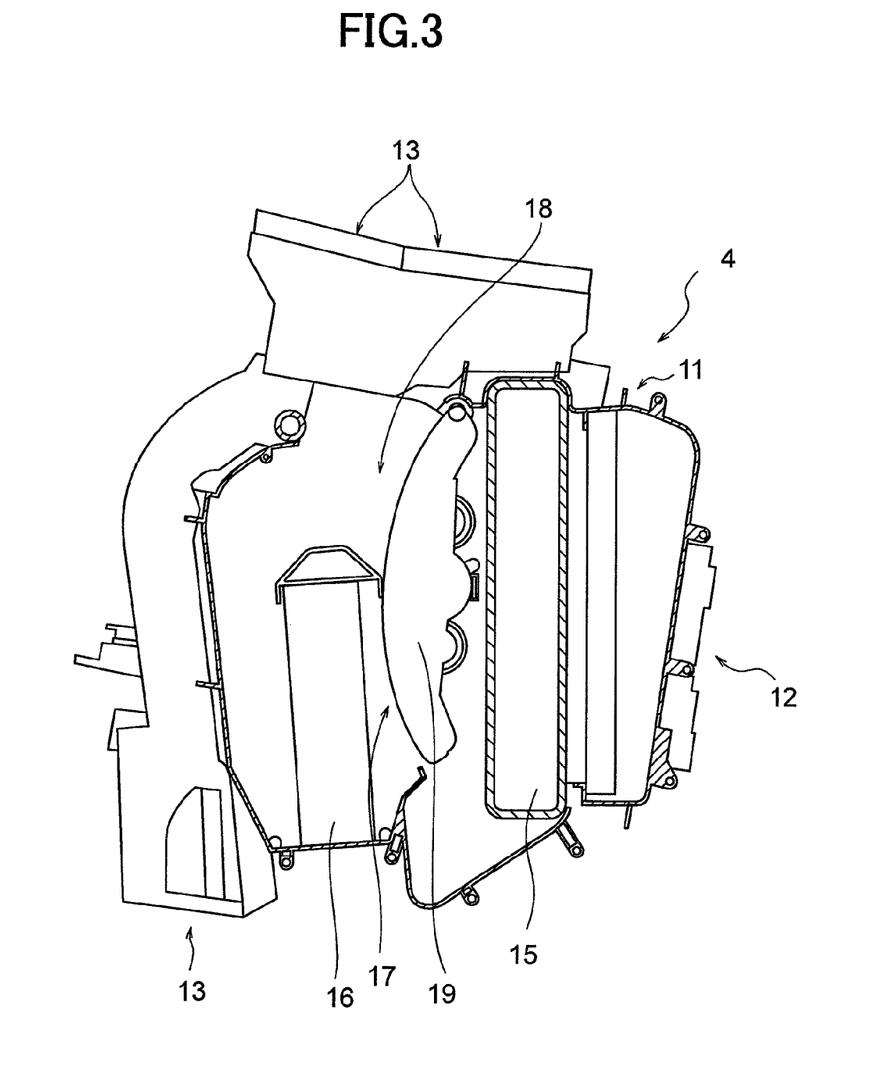
FIG. 3 is a cross-sectional side view of an air-conditioner body in FIG. 1.

As shown in FIG. 3, the air-conditioner body 4 includes: a hollow air-conditioner casing 11; and an air inlet 12 and an air outlet 13 provided in this air-conditioner casing 11.

The hollow air-conditioner casing 11 includes therein an evaporator 15 (heat exchanger for cooling) and a heater core 16 (heat exchanger for heating) in this order from an upstream side. A space downstream of the evaporator 15 is separated by a partition wall into a warm-air passage 17 and a bypass passage 18, and the heater core 16 is provided inside the warm-air passage 17. Moreover, between the evaporator 15 and the heater core 16 is provided a mix door 19 which is capable of dividing and distributing conditioning air having passed through the evaporator 15 to the warm-air passage 17 and the bypass passage 18. In the case of FIG. 3, the mix door 19 is in an arc shape bulging toward the downstream side.

Here, the evaporator 15 cools conditioning air by utilizing evaporative latent heat of coolant used in the air conditioner 2. Moreover, the heater core 16 heats conditioning air by utilizing heat of cooling water heated by the engine.

Note that in this embodiment, the inside of the air-conditioner body 4 is divided into multiple zones, and the air conditioning is independently controlled by each of the zones.

Figure 4:
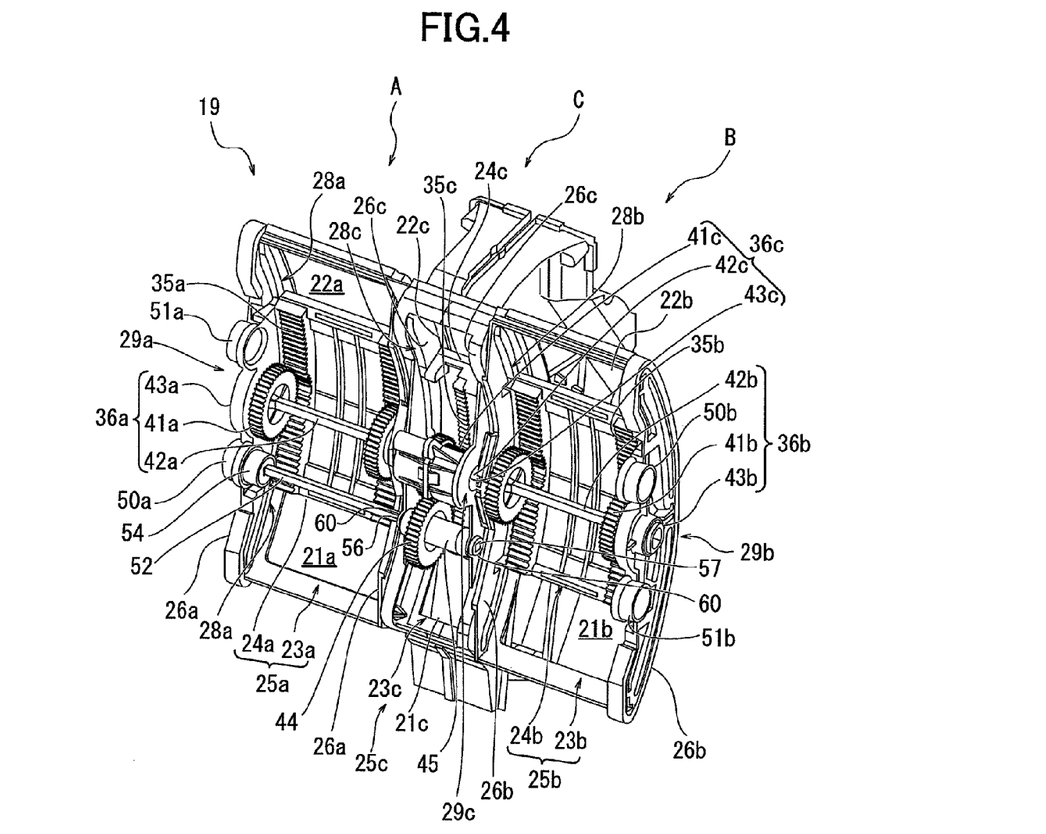
FIG. 4 is a perspective view of a mix door in FIG. 3 seen from a front side of the vehicle.

In the example shown in FIG. 4, the inside of the air-conditioner body 4 is divided into three zones A to C, namely, a driver seat zone A, a passenger seat zone B, and a rear seat zone C.

Specifically, if divided into the three zones A to C, the inside of the air-conditioner body 4 needs to be partitioned into as many areas as the zones A to C by using a partition wall (zone-dividing partition wall) and the like. Likewise, the mix door 19 also needs to be divided into as many parts as the zones A to C.

In FIG. 4, independent slide door units 25a, 25b, and 25c are provided in the zones A to C, respectively, and these are combined together by being coupled to each other in the direction of the axes of output shafts 42a, 42b, and 42c to be described later.

In the following, for the sake of explanation, components that are common among the slide door units 25a, 25b, and 25c will be denoted by the same reference numerals.

Further, components of the slide door unit 25a for controlling the air conditioning for the driver seat zone A will be described with letter "a" attached to their reference numerals. Components of the slide door unit 25b for controlling the air conditioning for the passenger seat zone B will be described with letter "b" attached to their reference numerals. Components of the slide door unit 25c for controlling the air conditioning for the rear seat zone C will be described with letter "c" attached to their reference numerals.

Moreover, components that are unique to a specific slide door unit will be described without attaching letter "a", "b", or "c" in their reference numerals.

Figure 5:
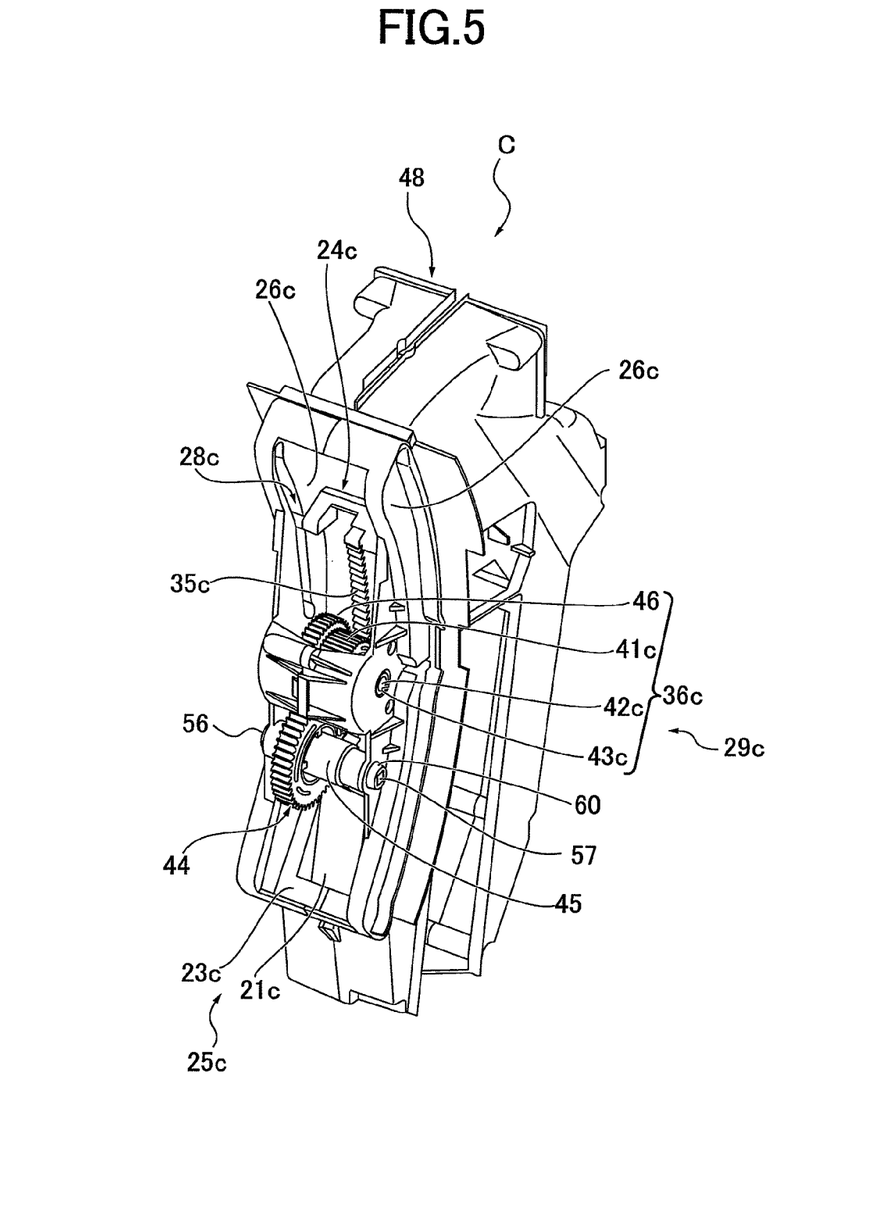
FIG. 5 is a perspective view of a slide door unit for a zone C in FIG. 4.
Figure 6:
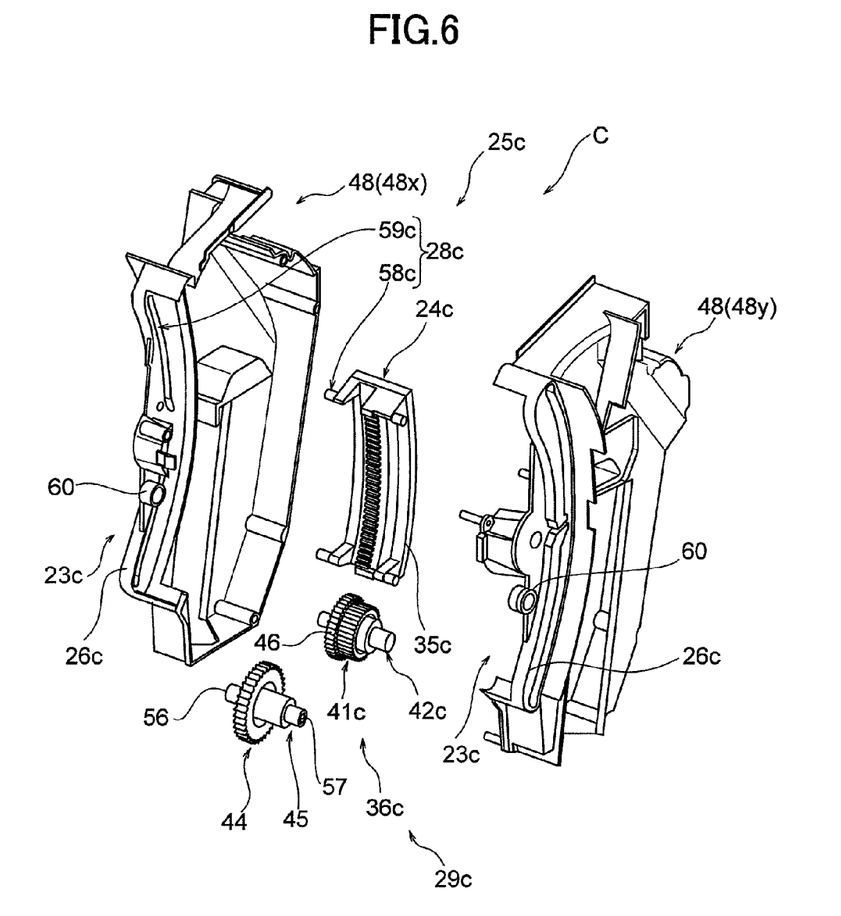
FIG. 6 is an exploded perspective view of FIG. 5.

As shown in FIGS. 4 to 6, the mix door 19 includes the slide door units 25a, 25b, and 25c which include frame-shaped slide door cases 23a, 23b, and 23c and slide door parts 24a, 24b, and 24c, respectively. The slide door cases 23a, 23b, and 23c have warm-air openings 21a, 21b, and 21c and cool-air openings 22a, 22b, and 22c, respectively. The slide door parts 24a, 24b, and 24c are capable of sliding along the slide door cases 23a, 23b, and 23c between the warm-air openings 21a, 21b, and 21c and the cool-air openings 22a, 22b, and 22c to open and close the warm-air openings 21a, 21b, and 21c and the cool-air openings 22a, 22b, and 22c or to adjust their opening degrees, respectively.

The slide door units 25a, 25b, and 25c also include pairs of door attachment wall parts 26a, 26b, and 26c which allow the pairs of slide door parts 24a, 24b, and 24c to be attached to both lateral sides of the slide door cases 23a, 23b, and 23c, respectively.

The slide door units 25a, 25b, and 25c also include slide guide parts 28a, 28b, and 28c on which the slide door parts 24a, 24b, and 24c are supported slidably, respectively.

As shown in FIG. 6, of these slide guide parts 28a, 28b, and 28c, the slide guide part 28c includes: guide pins 58c projecting from both lateral sides of the slide door part 24c; and guide grooves 59c provided in the door attachment wall parts 26c.

Though not illustrated, similar guide pins and guide grooves are provided to the slide door units 25a and 25b, as well as the slide door unit 25c.

Further, the slide door units 25a, 25b, and 25c include slide drive parts 29a, 29b, and 29c capable of driving the slide of the slide door parts 24a, 24b, and 24c, respectively.

Among them, the slide drive parts 29a and 29b of the slide door units 25a and 25b in the driver and passenger seat zones A and B located on both lateral sides include: rack parts 35a and 35b which are provided to the slide door parts 24a and 24b and extend in the direction of the slide; and gear mechanism parts 36a and 36b which transmit drive force to the rack parts 35a and 35b.

These gear mechanism parts 36a and 36b are formed mainly of: output gears 41a and 41b directly meshing with the rack parts 35a and 35b; the aforementioned output shafts 42a and 42b attached to the axial centers of the output gears 41a and 41b; and shaft supports 43a and 43b through which the output shafts 42a and 42b are rotationally supported on the door attachment wall parts 26a and 26b.

In addition, the rack parts 35a and 35b are each provided in a pair on both lateral sides of the corresponding one of the slide door parts 24a and 24b. To match the rack parts 35a and 35b, the output gears 41a and 41b are each provided in a pair in the vicinity of both ends of the corresponding one of the output shafts 42a and 42b. Both end portions of the output shafts 42a and 42b are rotationally supported on the door attachment wall parts 26a and 26b through the shaft supports 43a and 43b. Moreover, the output shafts 42a and 42b are provided at positions between the warm-air openings 21a and 21b and the cool-air openings 22a and 22b along the direction of the slide.

With the above-described structure, it is possible to prevent conditioning air from directly hitting the output gears 41a and 41b constituting the gear mechanism parts 36a and 36b, or to make it difficult for the conditioning air to hit them.

Note that unillustrated drive devices such as DC motors or pulse motors are connected to the output shafts 42a and 42b and generate drive force for performing the opening and closing operations or opening-degree adjusting operations of the slide door parts 24a and 24b.

On the other hand, in the case of the slide door unit 25c in the rear seat zone C located in the middle, placing its output shaft at a position right between the warm-air opening 21c and the cool-air opening 22c leads to a situation where the output shafts 42a and 42b obstruct and prevent an external drive device from directly connecting to the output shaft.

For this reason, as shown in FIG. 5, an inner input shaft 45 including an input gear 44 is additionally provided on, for example, the warm-air opening 21c side which is exposed to relatively small air flow as compared to the cool-air opening 22c side. In this way, the output shaft can be connected to the external drive device indirectly through the inner input shaft 45. Here, the input gear 44 and the inner input shaft 45 constitute an inner input shaft part.

Note that the inner input shaft part (the inner input shaft 45 and the input gear 44) is rotationally supported on two sides at both end portions thereof on two bearings 60 provided to the pair of door attachment wall parts 26c of the slide door unit 25c in the rear seat zone C.

Moreover, if necessary, an intermediate gear 46 which meshes with the input gear 44 may be provided around the output shaft 42c.

Here, the inside of the air-conditioner body 4 is divided into the multiple zones A to C. However, since it is difficult to increase the width of the air-conditioner body 4, the width of each of the zones A to C needs to be set small so that the difficulty can be solved.

For this reason, in FIG. 4, the slide door unit 25c in the rear seat zone C is made narrower than the slide door unit 25a in the driver seat zone A and the slide door unit 25b in the passenger seat zone B.

Moreover, since the slide door unit 25c in the rear seat zone C is narrow, there is not enough space to provide the output gear 41c of the gear mechanism part 36c in a pair on both lateral sides like the slide door unit 25a in the driver seat zone A and the slide door unit 25b in the passenger seat zone B. Thus, one output gear 41c is disposed in the center of the slide door case 23c in its width direction.

Note that as shown in FIG. 5, a partition wall part 48 (zone-dividing partition wall) is integrally provided on the downstream side of the slide door unit 25c (slide door case 23c) in the rear seat zone C. In addition, as shown in FIG. 6, the slide door unit 25c is dividable into left and right divided halves 48x and 48y, together with the partition wall part 48.

Figure 7:
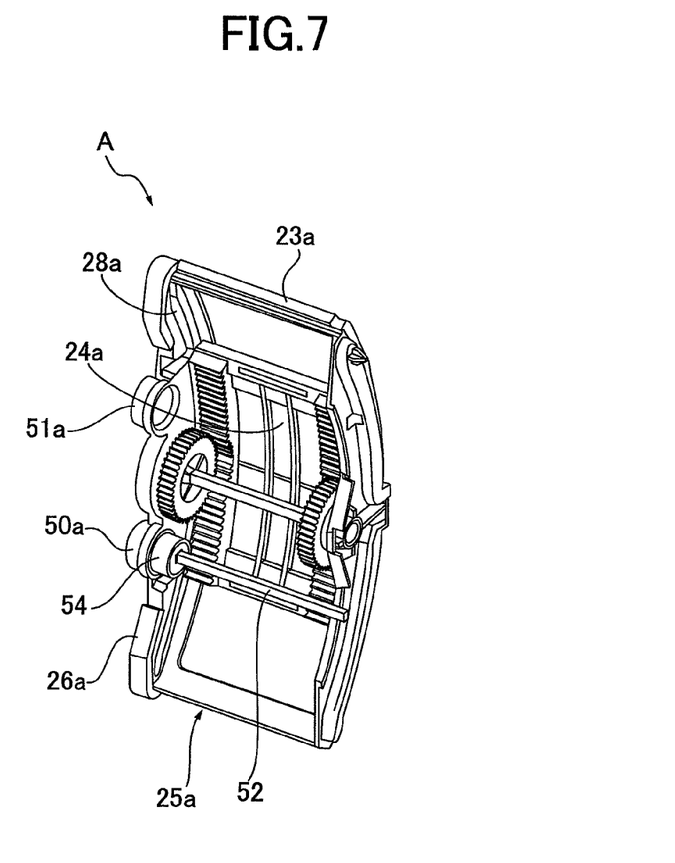
FIG. 7 is a perspective view of a slide door unit for a zone A in FIG. 4.

Moreover, as shown in FIG. 7, an outer input shaft 52 is placed in the slide door unit 25a in the driver seat zone A. This outer input shaft 52 transmits drive force for driving the opening and closing operations of the slide door part 24c of the slide door unit 25c in the rear seat zone C. A rotary member 54 formed of a bearing ring is attached to an outer end portion of the outer input shaft 52. Moreover, the outer input shaft 52 and the rotary member 54 constitute an outer input shaft part.

Further, through the rotary member 54, the outer input shaft part is rotationally supported at one side on a first shaft hole (first shaft support) 50a arranged in the door attachment wall part 26a of the slide door unit 25a in the driver seat zone A on the lateral side where the slide door unit 25a is not coupled to the slide door unit 25c in the rear seat zone C.

Furthermore, an unillustrated drive device such as a DC motor or pulse motor is connected to the outer input shaft part and generates drive force for performing the opening and closing operations or opening-degree adjusting operations of the slide door part 24c.

Note that the other end portion of the outer input shaft 52, to which the rotary member 54 is not coupled is coupled, to an end portion of the inner input shaft 45 on the side where the slide door unit 25c is coupled to the slide door unit 25a, by being fitted in a coupling hole 56 shown in FIG. 5 provided in that end portion of the inner input shaft 45. Moreover, the inner input shaft part and the outer input shaft part thus coupled constitute an input shaft.

Here, the outer input shaft 52 has an angular cross-sectional shape. Thus, drive force exerted on the outer input shaft 52 by the unillustrated drive device is securely transmitted to the inner input shaft 45 without slippage between the outer input shaft 52 and the coupling hole 56.

Moreover, in FIG. 4, the slide door unit 25a and the slide door unit 25b located on both lateral sides are formed in such a way that their shapes appear the same even when the direction in the drawing is turned upside down.

Further, the door attachment wall part 26a, among the pair of door attachment wall parts 26a of the slide door unit 25a, on the side (one side) where the slide door unit 25a is not coupled to the slide door unit 25c, and the door attachment wall part 26b, among the pair of door attachment wall parts 26b of the slide door unit 25b, on the side (the other side) where the slide door unit 25b is not coupled to the slide door unit 25c are set to face the opposite sides. In this way, the slide door unit 25a and the slide door unit 25b can be coupled to the slide door unit 25c.

Meanwhile, an unillustrated coupling member is provided to the door attachment wall part 26a, among the pair of door attachment wall parts 26a of the slide door unit 25a, on the side where the slide door unit 25a is coupled to the slide door unit 25c, and to the door attachment wall part 26b, among the pair of door attachment wall parts 26b of the slide door unit 25b, on the side where the slide door unit 25b is coupled to the slide door unit 25c. The coupling members allow the door attachment wall parts 26a and 26b to be coupled to the door attachment wall part 26c of the slide door unit 25c.

More specifically, the first shaft hole (first shaft support) 50a that rotationally supports the rotary member 54 coupled to the outer input shaft 52 is provided in the door attachment wall part 26a, among the pair of door attachment wall part 26a of the slide door unit 25a, on the side where the slide door unit 25a is not coupled to the slide door unit 25c, as described above. In addition to this, a second shaft hole (second shaft support) 51a having the same shape as the first shaft hole (first shaft support) 50a is provided in the slide door unit 25a at a position where a line extending from the axis of the inner input shaft 45 intersects the door attachment wall part 26a on the side where the slide door unit 25a is not coupled to the slide door unit 25c in a state where the slide door unit 25a is turned upside down, arranged on the opposite side, and coupled to the slide door unit 25c.

Further, a first shaft hole 50b and a second shaft hole 51b are provided in the door attachment wall part 26b, among the pair of door attachment wall parts 26b of the slide door unit 25b, on the side where the slide door unit 25b is not coupled to the slide door unit 25c. The first shaft hole 50b and the second shaft hole 51b are provided such that the first shaft support and the second shaft support may be located at the same positions as the first shaft hole 50a and the second shaft hole 51a, respectively, in a state where the slide door unit 25b is turned upside down, arranged on the opposite side, and coupled to the slide door unit 25c.

Furthermore, a coupling hole 57 having the same shape as the coupling hole 56 is provided in an end portion of the inner input shaft 45 on the slide door unit 25b side.

Moreover, in a state where the slide door unit 25a and the slide door unit 25b are each turned upside down, arranged on the opposite side, and coupled to the slide door unit 25c, the outer input shaft 52 may be placed in the first shaft hole 50b in the slide door unit 25b with the rotary member 54 therebetween. Thus, the same configuration as FIG. 4 can be made.

Figure 8:
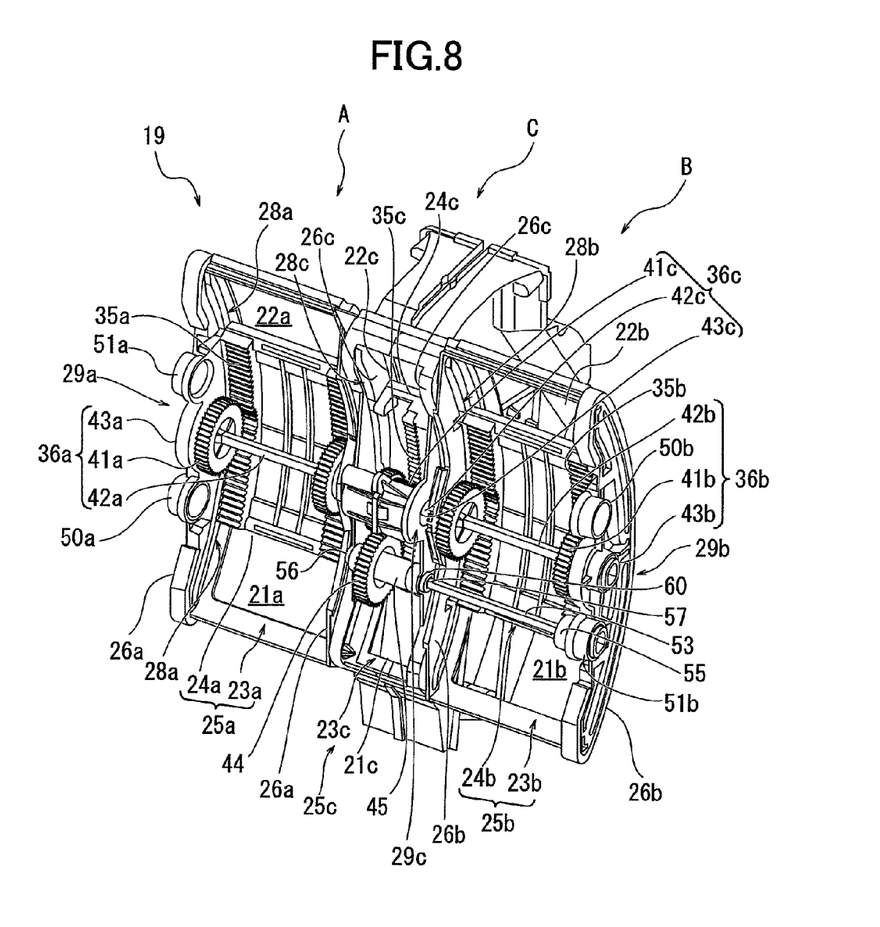
FIG. 8 is a perspective view of slide door units for zones A and B being switched.

In addition, as shown in FIG. 8, the rotary member 54 may be removed from the first shaft hole 50a in the slide door unit 25a and, as a rotary member 55, placed in the second shaft hole 51b in the slide door unit 25b. Further, the outer input shaft 52 may be removed and, as an outer input shaft 53, coupled at one end to the rotary member 55 and coupled by fitting at the other end to the coupling hole 57 provided in an axial end portion of the inner input shaft 45. In this way, drive force for performing the opening and closing operations or opening-degree adjusting operations of the slide door part 24c of the slide door unit 25c can be transmitted from the slide door unit 25b side.

Now, advantageous effects of this embodiment will be described.

(Advantageous Effect 1)

In the embodiment described above, of the three slide door units 25a, 25b, and 25c arranged side by side, the middle slide door unit 25c includes the input gear 44 and the intermediate gear 46 which transmit drive force to the rack part 35c extending in the direction of the slide of the slide door part 24c and to the output gear 41c meshing with the rack part 35c.

Moreover, the input shaft which is dividable into the inner input shaft parts (the input gear 44 and the inner input shaft 45) including the input gear 44 and the outer input shaft part (the outer input shaft 52 and the rotary member 54) is placed in parallel to the output shafts. Moreover, the inner input shaft part is rotationally supported on two sides at both end portions thereof on the bearings 60 provided to the pair of door attachment wall parts 26c of the middle slide door unit 25c.

Further, the outer input shaft part is rotationally supported on one side at an outer end portion thereof on the first shaft hole 50a provided in the outer door attachment wall part 26a of the slide door unit 25a located on the outermost side.

Furthermore, an inner end portion of the outer input shaft part can be coupled to the coupling hole 56 in the inner input shaft part. Thus, drive force for performing the opening and closing operations of the slide door part 24c can be securely transmitted to the output gear 41c of the middle slide door unit 25c.

Accordingly, an air conditioner capable of three-zone air conditioning can be formed with a simple configuration.

(Advantageous Effect 2)

In addition, in the embodiment described above, the inner input shaft part (the input gear 44 and the inner input shaft 45) of the middle slide door unit 25c has the coupling hole 56 to which the inner end portion of the outer input shaft part can be coupled by fitting. The inner input shaft part has the coupling hole 56 at least in the axial end portion of the inner input shaft part to which the outer input shaft part (the outer input shaft 52 and the rotary member 54) is coupled.

Moreover, the outer input shaft part rotationally supported on one side on the outer door attachment wall part 26a of the outermost slide door unit 25a can be separated from the inner input shaft part of the middle slide door unit 25c.

Thus, the outer input shaft 52 can be coupled to the coupling hole 56 in a state where the middle slide door unit 25c and the outermost slide door unit 25a are built. Accordingly, the ease in assembling the slide door units 25a, 25b, and 25c is improved.

(Advantageous Effect 3)

Further, in the embodiment described above, the pair of slide door units 25a and 25b located on the outermost sides are formed in the same shape and are usable also in a state where the outer door attachment wall parts 26a and 26b are turned upside down and set to face the opposite sides.

Thus, the slide door units 25a and 25b are identical components, allowing some parts to be common. Accordingly, the number of components can be reduced.

Moreover, in the embodiment described above, the outer door attachment wall part 26a of the slide door unit 25a includes both the first shaft support capable of rotationally supporting the outer end portion of the outer input shaft part (the outer input shaft 52 and the rotary member 54) on one side, and the second shaft support capable of rotationally supporting the outer end portion of the outer input shaft part (the outer input shaft 52 and the rotary member 54) on the other side.

Further, both end portions of the inner input shaft part (the input gear 44 and the inner input shaft 45) of the middle slide door unit 25c have the pair of coupling holes 56 and 57, respectively, to each of which the inner end portion of the outer input shaft part (the outer input shaft 52 and the rotary member 54) can be coupled by fitting.

Thus, the outer input shaft part (the outer input shaft 52 and the rotary member 54) provided on the one side in FIG. 4 can instead be provided on the other side as shown in FIG. 8.

In this way, it is possible to change the direction to transmit drive force for performing the opening and closing operations or opening-degree adjusting operations of the slide door part 24c, in accordance with the space where the drive device, such as a DC motor or pulse motor, for generating the drive force is placed. Accordingly, the freedom in the layout of the air conditioner can be improved.

Moreover, it is possible to change the direction to transmit the drive force for performing the opening and closing operations or opening-degree adjusting operations of the slide door part 24c, for example, between a left-hand-drive vehicle and a right-hand-drive vehicle.

Note that although the inner input shaft 45 and the input gear 44 provided to the middle slide door unit 25c have been described as separate components, similar advantageous effects can be achieved even when they are molded together as a single component.

Hereinabove, an embodiment of this invention has been described in detail with reference to drawings. However, the embodiment is merely an exemplary illustration of this invention. Thus, this invention is not limited solely to the configuration in the embodiment and naturally includes design changes and the like without departing from the gist of this invention. Moreover, when an embodiment includes multiple configurations for example, this invention naturally includes possible combinations of these configurations even without specific descriptions thereof. Further, when multiple embodiments and/or multiple modifications are given, this invention naturally includes possible combinations of configurations lying between these even without specific descriptions thereof. Also, this invention naturally includes the configurations depicted in the drawings even without specific descriptions thereof. Furthermore, when there is the wording "and/or the like," that wording is used to mean that something includes an equivalent.

What is claimed is:

1. A mix door structure, comprising:
   a first outer slide door unit;
   a second outer slide door unit; and
   a middle slide door unit disposed between the first outer slide door unit and the second outer slide door unit;
   wherein each of the first outer slide door unit and the second outer slide door unit includes:
      a pair of openings to blow air;
      a door to adjust the amount of opening of the pair of openings;
      an output gear;
      an output shaft supporting the output gear and configured for connection to an external rotation device;
      a rack part to drive the door by meshing with the output gear;
   wherein the middle slide door unit includes:
      a pair of openings to blow air;
      a door to adjust the amount of opening of the pair of openings of the middle slide door unit;
      an input gear;
      an inner input shaft supporting the input gear; and
      a rack part to drive the door by meshing with the input gear;
   wherein the inner input shaft has at opposite ends thereof coupling holes provided to face the first outer slide door unit and the second outer slide door unit, respectively,
   wherein the first outer slide door unit and the second outer slide door unit are configured such that one outer input shaft is detachably attached to either the first outer slide door unit or the second outer slide door unit, the outer input shaft having at one end thereof a rotary member rotatably supported on the first outer slide door unit or the second outer slide door unit and at another end thereof an engagement part engageable with the coupling holes of the inner input shaft of the middle slide door unit,
   wherein, when the outer input shaft is attached to the first outer slide door unit, the rotary member of the outer input shaft is directly rotatably supported on the first outer slide door unit and the engagement part is engaged in the coupling hole of the inner input shaft facing the first outer slide door unit, and the external rotation device is disposed at a side of the first outer slide door unit and connected to the rotary member,
   wherein, when the outer input shaft is attached to the second outer slide door unit, the rotary member of the outer input shaft is directly rotatably supported on the second outer slide door unit and the engagement part is engaged in the coupling hole of the inner input shaft facing the second outer slide door unit, and the external rotation device is disposed at a side of the second outer slide door unit and connected to the rotary member.

2. The mixed door structure of claim 1, wherein;
   when the outer input shaft is attached to the first outer slide door unit, the rotary member of the outer input shaft is directly rotatably supported on the first outer slide door unit by a first shaft support on the first outer slide door unit, and when the outer input shaft is attached to the second outer slide door unit, the rotary member of the outer input shaft is directly rotatably supported on the second outer slide door unit by a second shaft support on the second outer slide door unit.

\* \* \* \* \*